US009800826B2

United States Patent
Wang et al.

(10) Patent No.: US 9,800,826 B2
(45) Date of Patent: Oct. 24, 2017

(54) METHOD AND DEVICE FOR ADJUSTING FRAME RATE OF VIDEO RECORDING

(71) Applicant: ZTE Corporation, Shenzhen (CN)

(72) Inventors: Yulei Wang, Shenzhen (CN); Xia Sheng, Shenzhen (CN); Shifeng Que, Shenzhen (CN); Xiangjie Tong, Shenzhen (CN)

(73) Assignee: XI'AN ZHONGXING NEW SOFTWARE CO. LTD, Xi'An (CN)

( * ) Notice: Subject to any disclaimer, the term of this patent is extended or adjusted under 35 U.S.C. 154(b) by 0 days.

(21) Appl. No.: 15/031,818

(22) PCT Filed: Apr. 29, 2014

(86) PCT No.: PCT/CN2014/076469
§ 371 (c)(1),
(2) Date: Apr. 25, 2016

(87) PCT Pub. No.: WO2014/177049
PCT Pub. Date: Nov. 6, 2014

(65) Prior Publication Data
US 2016/0249012 A1    Aug. 25, 2016

(30) Foreign Application Priority Data
Oct. 23, 2013    (CN) .......................... 2013 1 0504172

(51) Int. Cl.
*H04N 7/01*    (2006.01)
*H04N 5/232*    (2006.01)
(Continued)

(52) U.S. Cl.
CPC ........... *H04N 7/0127* (2013.01); *H04N 5/235* (2013.01); *H04N 5/23241* (2013.01); *H04N 5/77* (2013.01)

(58) Field of Classification Search
CPC .. H04N 7/0127; H04N 5/23241; H04N 5/235; H04N 5/77
(Continued)

(56) References Cited

U.S. PATENT DOCUMENTS

| 2007/0216771 A1 | 9/2007 | Kumar |
| 2009/0160976 A1* | 6/2009 | Chen .................... H04N 5/2354 348/234 |

(Continued)

FOREIGN PATENT DOCUMENTS

| CN | 101631199 A | 1/2010 |
| CN | 102301711 A | 12/2011 |

(Continued)

OTHER PUBLICATIONS

International Search Report for corresponding application PCT/CN2014/076469 filed on Apr. 29, 2014; Mail date Jul. 21, 2014.
(Continued)

*Primary Examiner* — Mishawn Hunter
(74) *Attorney, Agent, or Firm* — Cantor Colburn LLP

(57) ABSTRACT

Provided are a method and device for adjusting a frame rate of video recording. According to the method, data collected by a sensor of a terminal is acquired; state information is determined according to the acquired data, wherein the state information is used for adjusting a frame rate of video recording of the terminal; the frame rate of video recording of the terminal is adjusted according to the determined state information, thereby reducing the power consumption of the terminal. The technical solution solves the problem in related art of additional power consumption because the frame rate of video recording is dynamically adjusted based on features of an image frame, reduces the power consumption of a video recording function, and improves the endurance capability of the terminal.

8 Claims, 3 Drawing Sheets

(51) Int. Cl.
　　　*H04N 5/235*　　(2006.01)
　　　*H04N 5/77*　　　(2006.01)
(58) Field of Classification Search
　　　USPC .......................... 386/239, 242, 248
　　　See application file for complete search history.

(56) References Cited

U.S. PATENT DOCUMENTS

2009/0244317 A1* 10/2009 Makii ................. H04N 5/23245
　　　　　　　　　　　　　　　　　　　　　　　348/229.1
2012/0197488 A1*  8/2012 Lee ..................... H04L 63/0861
　　　　　　　　　　　　　　　　　　　　　　　701/36

FOREIGN PATENT DOCUMENTS

| CN | 102937480 A | 2/2013 |
| CN | 103347152 A | 10/2013 |
| JP | 2009118164 A | 7/2014 |

OTHER PUBLICATIONS

Supplementary European Search Report Application No. EP14791331; Dated Sep. 21, 2016; pp. 6.

\* cited by examiner

METHOD AND DEVICE FOR ADJUSTING FRAME RATE OF VIDEO RECORDING

TECHNICAL FIELD

The present disclosure relates to the field of video processing, and in particular to a method and device for adjusting a frame rate of video recording.

BACKGROUND

In related art, a terminal device is increasingly applied, and the hardware capability of the terminal device becomes increasingly strong. For example, the current terminal device is generally equipped with a processor, at least one camera, at least one sensor, and so on. Because of these devices equipped, the terminal has various functions, for example, a video recording function.

Generally, the video recording function of the terminal is just an auxiliary function, for example, in a smart phone or a tablet computer, a communication function (e.g. a calling function or a data communication function) is the main function. Because the current mobile terminal device is usually equipped with a multi-core high-frequency processor, a large screen, an advanced graphic function, high-speed network access and other typical features, the whole power consumption of the mobile terminal device becomes increasingly high. At the same time, because of being limited to the current battery technology, the mobile terminal device may have a serious problem of needing to be charged frequently, which directly influences the use of the user. In this case, how to reduce the power consumption of the auxiliary function, especially the video recording function will be vital. For example, after the user surfs the Internet for three hours and records videos continuously for one hour, the mobile terminal device may prompt low power; after a period of time, a serious problem that the mobile terminal device is powered off because of the low power may occur during an important call. If the power consumption of video recording can be reduced, then the important call will not be missed. In related art, a method of dynamically adjusting I frame/B frame/P frame of an image by adopting features of an image frame to reduce the frame rate is adopted, but an additional encoding and decoding algorithm is needed for the image frame, which causes additional power consumption generated.

Aiming at the problem in related art of additional power consumption because the frame rate of video recording is dynamically adjusted based on features of the image frame, no solution has been presented yet.

SUMMARY

The embodiments of the present disclosure provide a method and device for adjusting a frame rate of video recording, for solving the problem in related art of additional power consumption because the frame rate of video recording is dynamically adjusted based on features of an image frame.

According to an aspect of the embodiments of the present disclosure, a method for adjusting the frame rate of video recording is provided, which includes that: data collected by a sensor of a terminal is acquired; state information is determined according to the acquired data; and the frame rate of video recording of the terminal is adjusted according to the determined state information.

In an example embodiment, determining the state information according to the acquired data, and adjusting the frame rate of video recording of the terminal according to the determined state information includes that: a moving state of the terminal is determined according to the acquired data; and the frame rate of video recording of the terminal is adjusted according to the determined moving state of the terminal.

In an example embodiment, adjusting the frame rate of video recording of the terminal according to the determined moving state of the terminal includes that: the frame rate of video recording of the terminal is adjusted according to a speed or acceleration of the terminal, wherein the higher the speed or the acceleration is, the higher the frame rate of video recording is.

In an example embodiment, adjusting the frame rate of video recording of the terminal according to the speed or the acceleration of the terminal includes that: a range in which the speed or the acceleration of the terminal falls is determined, wherein multiple ranges for speed or acceleration of the terminal are formed in advance, and a frame rate of video recording is set for a respective one of the multiple ranges; and the frame rate of video recording of the terminal is adjusted according to the frame rate of video recording corresponding to the range in which the speed or the acceleration of the terminal falls.

In an example embodiment, determining the state information according to the acquired data, and adjusting the frame rate of video recording of the terminal according to the determined state information includes that: light intensity of an environment which the terminal is in is determined according to the acquired data; and the frame rate of video recording of the terminal is adjusted according to the determined light intensity of the environment which the terminal is in.

According to another aspect of the embodiments of the present disclosure, a device for adjusting the frame rate of video recording is provided, which includes: an acquiring component, which is configured to acquire the data collected by the sensor of the terminal; a determining component, which is configured to determine the state information according to the acquired data; and an adjusting component, which is configured to adjust the frame rate of video recording of the terminal according to the determined state information.

In an example embodiment, the determining component is configured to determine the moving state of the terminal according to the acquired data; and the adjusting component is configured to adjust the frame rate of video recording of the terminal according to the determined moving state of the terminal.

In an example embodiment, the adjusting component is configured to adjust the frame rate of video recording of the terminal according to the speed or the acceleration of the terminal, wherein the higher the speed or the acceleration is, the higher the frame rate of video recording is.

In an example embodiment, the adjusting component includes: a determining element, which is configured to determine the range in which the speed or the acceleration of the terminal falls, wherein multiple ranges for speed or acceleration of the terminal are formed in advance, and a frame rate of video recording is set for a respective one of the multiple ranges; and an adjusting element, which is configured to adjust the frame rate of video recording of the terminal according to the frame rate of video recording corresponding to the range in which the speed or the acceleration of the terminal falls.

In an example embodiment, the determining component is configured to determine, according to the acquired data, the light intensity of the environment which the terminal is in; and the adjusting component is configured to adjust the frame rate of video recording of the terminal according to the determined light intensity of the environment which the terminal is in.

By virtue of the technical solution, the data collected by the sensor of the terminal is acquired, the state information is determined according to the acquired data, wherein the state information is used for adjusting the frame rate of video recording of the terminal, and the frame rate of video recording of the terminal is adjusted according to the determined state information, thereby reducing the power consumption of the terminal. The embodiments of the present disclosure solve the problem of additional power consumption because the frame rate of video recording is dynamically adjusted based on features of an image frame, reduce the power consumption of the video recording function, and improve the endurance capability of the terminal.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure and not intended to form an improper limit to the present disclosure. In the accompanying drawings.

DETAILED DESCRIPTION OF THE EMBODIMENTS

Note that, embodiments and features in embodiments in the application can be combined with each other on condition of not conflicting. The present disclosure is elaborated below with reference to the accompanying drawings and in combination with embodiments.

Figure 1:
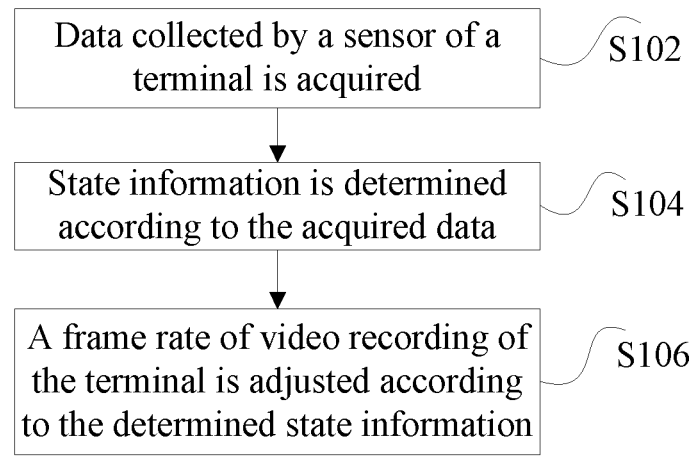
FIG. 1 shows a flowchart of a method for adjusting the frame rate of video recording according to an embodiment of the present disclosure.

In the present embodiment, a method for adjusting the frame rate of video recording is provided. FIG. 1 shows a flowchart of the method for adjusting the frame rate of video recording according to an embodiment of the present disclosure. As shown in FIG. 1, the flow includes the following steps:

S102: data collected by a sensor of a terminal is acquired;

S104: state information is determined according to the acquired data; and

S106: the frame rate of video recording of the terminal is adjusted according to the determined state information.

Through the above steps, the sensor of the terminal collects the data, the state information of the terminal is acquired according to the acquired data, and the frame rate of video recording of the terminal is adjusted according to the acquired state information, so that the frame rate of video recording of the terminal dynamically changes with the change of the state information, the change of the frame rate of video recording can make the terminal not always in a state of high power consumption. Compared with a method in related art of dynamically adjusting I frame/B frame/P frame of an image by adopting features of an image frame to reduce the frame rate, in the above steps, the power consumption needed by using a sensor device is comparatively low, while in related art, the additional encoding and decoding algorithm is needed for the image frame, which causes additional power consumption generated. Besides, using the sensor to collect the data and adjusting the frame rate of video recording according to the determined state information can make the load of a processor comparatively low, while the load of the processor of software encoding and decoding algorithm in related art is comparatively high. So, through the above steps, the power consumption of the terminal is reduced, the endurance capability of the terminal is improved, and the user experience is improved.

The state information is involved in S104; information as long as having an impact on the frame rate of video recording belongs to the state information. For example, the sensor of the terminal may acquire various state information, such as displacement state information, temperature state information, and light state information. Two kinds of state information are listed in the present embodiment as examples.

In an example embodiment 1, the state information includes a moving state of the terminal.

The sensor on the terminal can sense the moving state of the terminal, then, the frame rate of video recording of the terminal is adjusted according to the determined moving state of the terminal. For example, the moving state of the terminal may be determined according to a speed or acceleration of the terminal. Generally, the higher a moving speed is, for ensuring the quality of video recording, it is needed to increase the frame rate of the video recording. In an example embodiment, when the terminal is in a relatively static state, a lower frame rate of video recording may be set; when the terminal is in a relatively moving state, a higher frame rate of video recording may be set.

In order to reduce the frequency of reducing or adjusting the frame rate of video recording, the speed or the acceleration can be divided into multiple ranges, and different frame rates of video recording are set aiming at different ranges. In this case, step S106 may include that: a range in which the speed or the acceleration of the terminal falls is determined, wherein multiple ranges for speed or acceleration of the terminal are formed in advance, and a frame rate of video recording is set for a respective one of the multiple ranges; the frame rate of video recording of the terminal is adjusted according to the frame rate of video recording corresponding to the range in which the speed or the acceleration of the terminal falls.

For example, for implementing a relatively simple adjustment, the speed or the acceleration may be divided into two ranges, one of which exceeds a threshold, and the other of which is less than the threshold. At this point, the range exceeding a threshold speed or acceleration corresponds to a relatively high frame rate of video recording, and the range less than the threshold speed or acceleration corresponds to a relatively low frame rate of video recording. Certainly, if it is expected to adjust the frame rate of video recording more accurately, a few more ranges of the speed or the acceleration may be set. The number of the ranges and the values of the ranges may be selected according to the actual conditions, for example, according to the processing capability of the terminal.

In an example embodiment 2, the state information includes the determined light intensity of the environment which the terminal is in.

In an example implementation, the light intensity of the environment which the terminal is in is determined according to the acquired data; and the frame rate of video recording of the terminal is adjusted according to the determined light intensity of the environment which the terminal is in.

Figure 2:
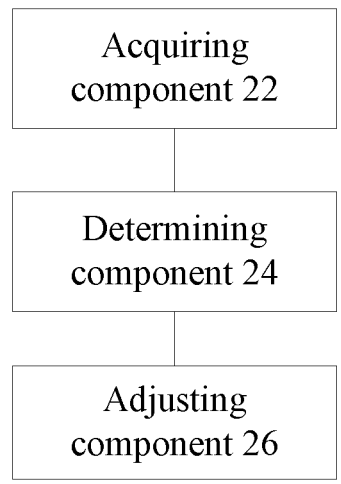
FIG. 2 shows a structure diagram of a device for adjusting the frame rate of video recording according to an embodiment of the present disclosure.

In the present embodiment, a device for adjusting the frame rate of video recording is also provided, which is used for implementing the above method. What have been described in the above method will not be repeated here. It should be noted that the name of a component in the device should not be understood as a limitation to the component. For example, the adjusting component being configured to adjust the frame rate of video recording of the terminal according to the determined state information may also be described as "a component which is configured to adjust the frame rate of video recording of the terminal according to the determined state information". The functions of the components described below can be implemented by the processor. FIG. 2 shows a structure diagram of a device for adjusting the frame rate of video recording according to an embodiment of the present disclosure. As shown in FIG. 2, the device includes: an acquiring component 22, a determining component 24 and an adjusting component 26.

In an example embodiment, the acquiring component 22 is configured to acquire the data collected by the sensor of the terminal; the determining component 24 is configured to determine the state information according to the acquired data, wherein the state information is used for adjusting the frame rate of video recording of the terminal; and the adjusting component 26 is configured to adjust the frame rate of video recording of the terminal according to the determined state information.

In an example embodiment, the determining component 24 is configured to determine a moving state of the terminal according to the acquired data; the adjusting component 26 is configured to adjust the frame rate of video recording of the terminal according to the determined moving state of the terminal.

In an example embodiment, the adjusting component 26 is configured to adjust the frame rate of video recording of the terminal according to a speed or acceleration of the terminal, for example, when the terminal is in the relatively static state, a lower frame rate of video recording is set; when the terminal is in the relatively moving state, a higher frame rate of video recording is set.

Figure 3:
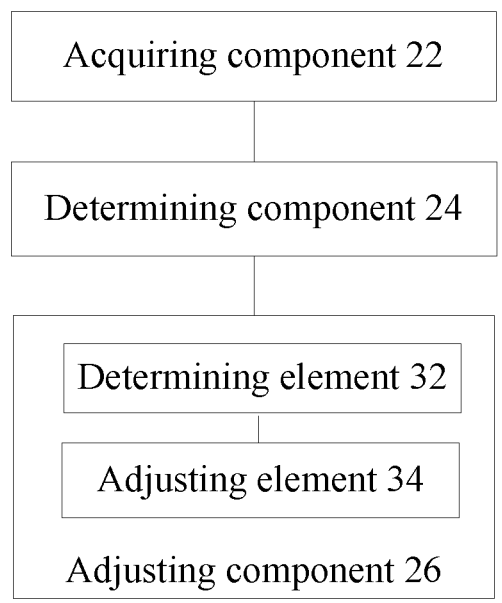
FIG. 3 shows an example structure diagram of the device for adjusting the frame rate of video recording according to an embodiment of the present disclosure.

FIG. 3 shows an example structure diagram of the device for adjusting the frame rate of video recording according to an embodiment of the present disclosure. As shown in FIG. 3, the adjusting component 26 further includes: a determining element 32 and an adjusting element 34.

In an example embodiment, the adjusting component 26 includes: the determining element 32, which is configured to determine a range in which the speed or the acceleration of the terminal falls, wherein multiple ranges for speed or acceleration of the terminal are formed in advance, and a frame rate of video recording is set for a respective one of the multiple ranges; and the adjusting element 34, which is configured to adjust the frame rate of video recording of the terminal according to the frame rate of video recording corresponding to the range in which the speed or the acceleration of the terminal falls.

In an example embodiment, the determining component 24 is configured to determine, according to the acquired data, a light intensity of an environment which the terminal is in; the adjusting component 26 is configured to adjust the frame rate of video recording of the terminal according to the determined light intensity of the environment which the terminal is in.

An illustration is given below by combining an example embodiment and taking a dynamic adjustment of the frame rate in a video recording application scenario for example.

In the example embodiment, for reducing the power consumption of a single functional subcomponent in a mobile terminal device, an algorithm of dynamically adjusting the frame rate according to feature data collected by the sensor device and a policy of automatically triggering the sensor device to collect the feature data are adopted. In the example embodiment, a method for reducing the power consumption by using the feature data collected by the sensor device to dynamically adjust during video recording is adopted, and the method for reducing the frame rate by adopting the features of the image frame to dynamically adjust I frame/B frame/P frame of an image is abandoned. The main difference between the two methods is that: firstly, the power consumption needed by using the sensor device is comparatively low, and generally a sensor function of the mobile terminal device is enabled by default, but the additional encoding and decoding algorithm is needed for the image frame, which causes additional power consumption generated; secondly, the CPU load of the processor of the method in the example embodiment is comparatively low, but dynamically adjusting the image involves the software encoding and decoding algorithm, which causes the CPU load to increase dramatically, thereby directly influencing the whole power consumption of the mobile terminal device.

In the example embodiment, with the algorithm of dynamically adjusting the frame rate according to the feature data collected by the sensor device, the dynamic adjustment of the frame rate is implemented according to the feature data collected by the sensor device when a video recording function is enabled. When the mobile terminal device is in the relatively static state, and the feature data collected by the sensor device is in a relatively static range, then a lower frame rate of video recording is set; when the mobile terminal device is in the relatively moving state, and the feature data collected by the sensor device is in a relatively moving range, then a higher frame rate of video recording is set. The aim of reducing the power consumption is achieved by using the algorithm of dynamically adjusting the frame rate.

An illustration is given below by taking the mobile terminal device for example.

I. A Subsystem For Dynamically Adjusting the Frame Rate is Built.

For coinciding with building of the subsystem for dynamically adjusting the frame rate, a hardware solution the mobile terminal device may adopt is that: an application processing chip may adopt a 1.5 GHz Snapdragon APQ8064 quad-core processor of Qualcomm in conjunction with a memory combination of 2 GB RAM+16 GB ROM, which has a high running speed; a high-definition camera with 13,000,000 pixels is equipped, which supports LED fill light and supports video recording of 1080P easily; a light sensor, a proximity sensor, an acceleration sensor, a direction sensor, a magnetic sensor and other sensor devices are equipped. A software solution the mobile terminal device may adopt is a software platform developed based on an Android4.1 (Jelly Bean) basic edition provided by Qualcomm Inc. The software framework follows a design mode of the Android system, and maintains consistency and compatibility with the existing framework. Note that, these configurations are only an example embodiment, and the implementation of the technical solution should not be limited to this particular configuration.

II. The Algorithm of Dynamically Adjusting the Frame Rate.

With the algorithm of dynamically adjusting the frame rate according to the feature data collected by the sensor device, the dynamic adjustment of the frame rate is implemented according to the feature data collected by the sensor device when the video recording function is enabled. When the mobile terminal device is in the relatively static state, and the feature data collected by the sensor device is in a relatively static range, then a lower frame rate of video recording is set; when the mobile terminal device is in the relatively moving state, and the feature data collected by the sensor device is in a relatively moving range, then a higher frame rate of video recording is set. Suppose that the feature data collected by the sensor device is divided into ranges of four levels: level 1 is set as a relatively static range, and the lowest frame rate of video recording corresponding to this level is 24 fps; level 2 is set as a relatively weak moving range, and the frame rate of video recording corresponding to this level is 30 fps; level 3 is set as a relatively moderate moving range, and the frame rate of video recording corresponding to this level is 45 fps; level 4 is set as a relatively strong moving range, and the frame rate of video recording corresponding to this level is 60 fps.

Figure 4:
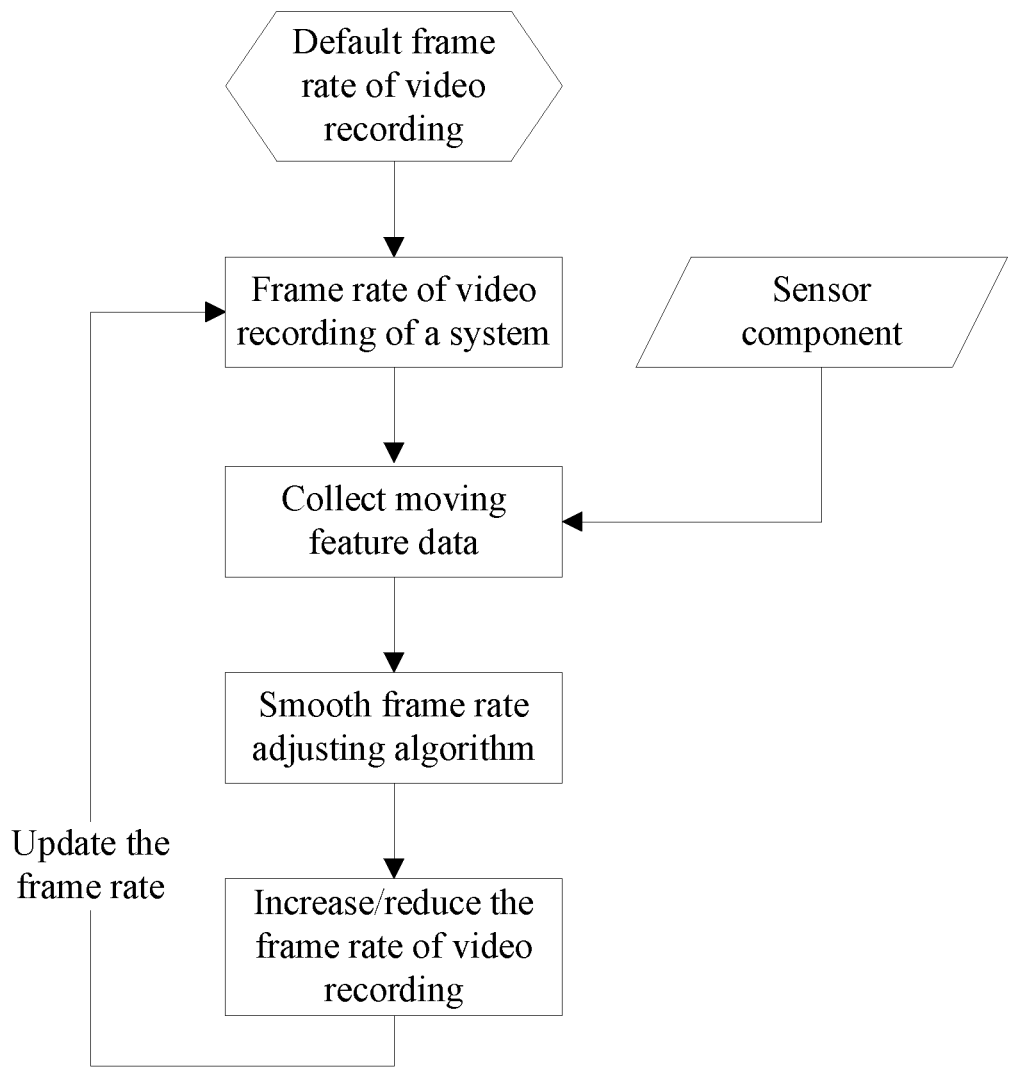
FIG. 4 shows a flowchart of adjusting the frame rate of video recording according to an example embodiment of the present disclosure.

FIG. 4 shows a flowchart of adjusting the frame rate of video recording according to an example embodiment of the present disclosure. As shown in FIG. 4, the flow includes that: when the mobile terminal device enables a camera component, a default frame rate of video recording is adopted, suppose that it is set as the frame rate of video recording of level 1 (namely 24 fps), and the current frame rate of video recording of a system is the default frame rate of video recording; after moving feature data is collected by the sensor device, a smooth frame rate adjusting algorithm is executed based on the level of frame rate corresponding to the level of currently collected moving feature data and the frame rate of video recording set by the system currently, to decide a frame rate to be set by the system, and then the frame rate of video recording of the system is correspondingly increased or reduced; at the same time, the frame rate of video recording configured by the system is updated.

III. Automatically Triggering a Feature Data Collecting Policy of the Sensor.

A functional menu of automatically triggering feature data collection of the sensor is configured in a video recording component of the mobile terminal device, which can make a user select to enable or disable the function of automatically triggering feature data collection of the sensor. Generally, the mobile terminal device is configured, by default, to enable the function of automatically triggering feature data collection of the sensor. For meeting usage scenario demands of different users, the user may independently select to enable or disable the function of automatically triggering feature data collection of the sensor. After the user enables the function of automatically triggering feature data collection of the sensor, when enabling a video recording component, a feature data collecting function of the sensor device is automatically triggered; when exiting a video recording mode (or going into a photographing mode), the feature data collecting function of the sensor device is automatically disabled. If the user disables a function of automatically adjusting the frame rate, then the sensor device is not triggered to collect the feature data.

Obviously, those skilled in the art should appreciate that the above components and steps of the present disclosure can be implemented by a general-purpose computing device, and they can be centralized in a single computing device or distributed on a network composed of multiple computing devices; optionally, they can be implemented by a program code which is capable of being executed by the computing device, so that they can be stored in a storage device and executed by the computing device, or they are made into integrated circuit components, respectively, or multiple components and steps of them are made into a single integrated circuit component to implement. Thus, the present disclosure is not limited to any particular combination of hardware and software.

The above is only the example embodiment of the present disclosure and not intended to limit the present disclosure; for those skilled in the art, the present disclosure may have various modifications and changes. Any modifications, equivalent replacements, improvements and the like within the principle of the present disclosure shall fall within the scope of the claims of the present disclosure.

INDUSTRIAL APPLICABILITY

The technical solutions provided by the embodiments of the present disclosure can be applied to the field of videos, solve the problem in related art of additional power consumption because the frame rate of video recording is dynamically adjusted based on features of the image frame, reduce the power consumption of the video recording function, and improve the endurance capability of the terminal.

What is claimed is:

1. A method for adjusting a frame rate of video recording, comprising:
    acquiring data collected by a sensor of a terminal;
    determining state information according to the acquired data; and
    adjusting a frame rate of video recording of the terminal according to the determined state information, wherein the determined state information contains: a speed or acceleration of the terminal, adjusting the frame rate of video recording of the terminal according to the speed or the acceleration of the terminal comprises:
    determining a range in which the speed or the acceleration of the terminal falls, wherein multiple ranges for speed or acceleration of the terminal are formed in advance, and a frame rate of video recording is set for a respective one of the multiple ranges; and adjusting the frame rate of video recording of the terminal according to the frame rate of video recording corresponding to the range in which the speed or the acceleration of the terminal falls.

2. The method as claimed in claim 1, wherein determining the state information according to the acquired data, and adjusting the frame rate of video recording of the terminal according to the determined state information comprises:
    determining a moving state of the terminal according to the acquired data; and
    adjusting the frame rate of video recording of the terminal according to the determined moving state of the terminal.

3. The method as claimed in claim 2, wherein adjusting the frame rate of video recording of the terminal according to the determined moving state of the terminal comprises:
   adjusting the frame rate of video recording of the terminal according to a speed or acceleration of the terminal, wherein the higher the speed or the acceleration is, the higher the frame rate of video recording is.

4. The method as claimed in claim 1, wherein determining the state information according to the acquired data, and adjusting the frame rate of video recording of the terminal according to the determined state information comprises:
   determining, according to the acquired data, light intensity of an environment which the terminal is in; and
   adjusting the frame rate of video recording of the terminal according to the determined light intensity of the environment which the terminal is in.

5. A device for adjusting a frame rate of video recording, comprising:
   an acquiring component, which is configured to acquire data collected by a sensor of a terminal;
   a determining component, which is configured to determine state information according to the acquired data; and
   an adjusting component, which is configured to adjust a frame rate of video recording of the terminal according to the determined state information, wherein the determined state information contains: a speed or acceleration of the terminal, the adjusting component comprises: a determining element, which is configured to determine a range in which the speed or the acceleration of the terminal falls, wherein multiple ranges for speed or acceleration of the terminal are formed in advance, and a frame rate of video recording is set for a respective one of the multiple ranges; and
   an adjusting element, which is configured to adjust the frame rate of video recording of the terminal according to the frame rate of video recording corresponding to the range in which the speed or the acceleration of the terminal falls.

6. The device as claimed in claim 5, wherein
   the determining component is configured to determine a moving state of the terminal according to the acquired data; and
   the adjusting component is configured to adjust the frame rate of video recording of the terminal according to the determined moving state of the terminal.

7. The device as claimed in claim 6, wherein the adjusting component is configured to adjust the frame rate of video recording of the terminal according to a speed or acceleration of the terminal, wherein the higher the speed or the acceleration is, the higher the frame rate of video recording is.

8. The device as claimed in claim 5, wherein
   the determining component is configured to determine, according to the acquired data, light intensity of an environment which the terminal is in; and
   the adjusting component is configured to adjust the frame rate of video recording of the terminal according to the determined light intensity of the environment which the terminal is in.

* * * * *